US011711617B2

(12) United States Patent
James et al.

(10) Patent No.: US 11,711,617 B2
(45) Date of Patent: *Jul. 25, 2023

(54) AUTOMATED CAMERA POSITIONING FOR FEEDING BEHAVIOR MONITORING

(71) Applicant: X Development LLC, Mountain View, CA (US)

(72) Inventors: Barnaby John James, Los Gatos, CA (US); Grace Taixi Brentano, Redwood City, CA (US); Laura Valentine Chrobak, Menlo Park, CA (US); Zhaoying Yao, Palo Alto, CA (US)

(73) Assignee: X Development LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/691,902

(22) Filed: Mar. 10, 2022

(65) Prior Publication Data

US 2022/0353422 A1 Nov. 3, 2022

Related U.S. Application Data

(63) Continuation of application No. 17/246,911, filed on May 3, 2021, now Pat. No. 11,297,247.

(51) Int. Cl.
*H04N 23/695* (2023.01)
*G06T 7/80* (2017.01)
(Continued)

(52) U.S. Cl.
CPC ........... *H04N 23/695* (2023.01); *A01K 61/80* (2017.01); *G06T 7/80* (2017.01); *H04N 7/18* (2013.01);
(Continued)

(58) Field of Classification Search
None
See application file for complete search history.

(56) References Cited

U.S. PATENT DOCUMENTS 6,000,362 A 12/1999 Blyth et al.
9,650,155 B2 * 5/2017 Wang ..................... B64C 13/20
(Continued)

FOREIGN PATENT DOCUMENTS

CN 103883138 6/2014
CN 106454268 2/2017
(Continued)

OTHER PUBLICATIONS

[No Author Listed] "Placentia Bav Atlantic Salmon Aquaculture Project Environmental Effects Monitoring Plan: Benthic Habitat Health," LGL Limited, LGL Rep. FA0159B, Jun. 2019, 61 pages.
(Continued)

*Primary Examiner* — Stefan Gadomski
(74) *Attorney, Agent, or Firm* — Fish & Richardson P.C.

(57) ABSTRACT

Methods, systems, and apparatus, including computer programs encoded on computer-readable storage media, for automated camera positioning for feeding behavior monitoring. In some implementations, a system obtains an image of a scene, a spatial model that corresponds to a subfeeder, and calibration parameters of a camera, the system determines a size of the subfeeder in the image of the scene, the system selects an updated position of the camera relative to the subfeeder, the system provides the updated position of the camera relative to the subfeeder to a winch controller, and the system moves the camera to the updated position.

20 Claims, 3 Drawing Sheets

(51) Int. Cl.
*A01K 61/80* (2017.01)
*H04N 7/18* (2006.01)
(52) U.S. Cl.
CPC .............. *G06T 2207/30232* (2013.01); *G06T 2207/30244* (2013.01)

(56) References Cited

U.S. PATENT DOCUMENTS

| | | | |
|---|---|---|---|
| 10,856,520 | B1 | 12/2020 | Kozachenok et al. |
| 11,148,294 | B2* | 10/2021 | Hayashi .................. G05D 1/02 |
| 2007/0003162 | A1 | 1/2007 | Miyoshi et al. |
| 2009/0296989 | A1 | 12/2009 | Ramesh et al. |
| 2010/0198023 | A1 | 8/2010 | Yanai et al. |
| 2012/0006277 | A1 | 1/2012 | Troy et al. |
| 2012/0055412 | A1 | 3/2012 | Chen et al. |
| 2012/0314030 | A1 | 12/2012 | Datta et al. |
| 2013/0206078 | A1 | 8/2013 | Melberg et al. |
| 2013/0284105 | A1 | 10/2013 | Han et al. |
| 2015/0302241 | A1 | 10/2015 | Eineren et al. |
| 2017/0105388 | A1 | 4/2017 | Pfeiff |
| 2017/0150701 | A1 | 6/2017 | Gilmore et al. |
| 2017/0169604 | A1 | 6/2017 | Van Der Zwan et al. |
| 2018/0107210 | A1 | 4/2018 | Harnett |
| 2018/0132459 | A1 | 5/2018 | Baba |
| 2019/0021292 | A1 | 1/2019 | Hayes |
| 2019/0025858 | A1* | 1/2019 | Bar-Nahum ............ G06V 20/13 |
| 2019/0096069 | A1* | 3/2019 | Qian ...................... B64C 39/024 |
| 2019/0228218 | A1 | 7/2019 | Barnaby et al. |
| 2019/0340440 | A1 | 11/2019 | Atwater et al. |
| 2019/0349533 | A1* | 11/2019 | Guo ...................... H04N 5/2253 |
| 2020/0107524 | A1 | 4/2020 | Messana et al. |
| 2020/0113158 | A1 | 4/2020 | Rishi |
| 2020/0155882 | A1 | 5/2020 | Tohidi et al. |
| 2020/0288678 | A1 | 9/2020 | Howe et al. |
| 2021/0215139 | A1 | 7/2021 | Roodenburg et al. |
| 2021/0279860 | A1 | 9/2021 | Ye et al. |
| 2022/0272255 | A1* | 8/2022 | Xiong ................ H04N 5/23299 |

FOREIGN PATENT DOCUMENTS

| | | |
|---|---|---|
| CN | 107593559 | 1/2018 |
| CN | 107996528 | 5/2018 |
| CN | 108040948 | 5/2018 |
| CN | 108338110 | 7/2018 |
| CN | 207940232 | 10/2018 |
| CN | 109757415 | 5/2019 |
| CN | 110476870 | 11/2019 |
| CN | 209768606 | 12/2019 |
| CN | 209803122 | 12/2019 |
| CN | 110870472 | 3/2020 |
| CN | 110881434 | 3/2020 |
| CN | 106665447 | 5/2020 |
| CN | 111789063 | 10/2020 |
| CN | 111838044 | 10/2020 |
| CN | 212060219 | 12/2020 |
| EP | 2244934 | 11/2010 |
| EP | 3484283 | 5/2019 |
| JP | 2002171853 | 6/2002 |
| KR | 200392371 | 8/2005 |
| KR | 100946942 | 3/2010 |
| KR | 20200089195 | 7/2020 |
| NO | 300401 | 5/1997 |
| NO | N0345829 | 10/2019 |
| TW | 1721851 | 11/1991 |
| TW | M603271 | 11/2020 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2014/179482 | 11/2014 |
| WO | WO 2016/023071 | 2/2016 |
| WO | WO 2018/011744 | 1/2018 |
| WO | WO 2019/002881 | 1/2019 |
| WO | WO 2019/121851 | 6/2019 |
| WO | WO 2019/188506 | 10/2019 |
| WO | WO 2019/212807 | 11/2019 |
| WO | WO 2019/232247 | 12/2019 |
| WO | WO 2020/046524 | 3/2020 |
| WO | WO 2020/072438 | 4/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |

OTHER PUBLICATIONS

Extended Search Report in European Appln. No. 22151132.2, dated May 2, 2022, 10 pages.
Fore et al. Precision fish farming: A new framework to improve production in aquaculture, Biosvstems Engineering vol. 173, pp. 176-193 (Year: 2018).
https://akvapartner.no [online], "Newly Patented Brattland Subfeeder," Sep. 2020, retrieved on Apr. 26, 2021, retrieved from URL<http://https://akvapartner.no/en/b/subfeeder>, 6 pages.
International Preliminary Report on Patentability in International Appln No. PCT/US2020/059829, dated May 27, 2022, 11 pages.
International Search Report and Written Opinion International Appln No. PCT/US2020/059829. dated Feb. 25, 2021, 18 pages.
Li et al., "Intelligent aquaculture," JWAS, Aug. 2020, 51(4):808-814.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition." Thesis for Master's degree in Artificial Intelligence, Norwegian University of Science and Technology, Jun. 2019, 86 pages.
Moskvyak et al., "Robust Re-identification of Manta Ravs from Natural Markings by Learning Pose Invariant Embeddings," CoRR, Feb. 2019, arXiv:1902.10847v1, 12 pages.
Odey, "AquaMesh—Design and Implementation of Smart Wireless Mesh Sensor Networks for Aquaculture," American Journal of Networks and Communications, Jul. 2013, 8 pages.
Office Action in Canadian Appln. No. 3,087,370, dated Aug. 4, 2021, 3 pages.
Petrov et al., "Ovendew of the application of computer vision technology in fish farming," E3S Web of Conferences, 2020, 175:02015.
Qiu et al., "Improving Transfer Learning and Squeeze-and-Excitation Networks for Small-Scale Fine-Grained Fish Image Classification," IEEE Access, Dec. 2018. 6(31):78503-78512.
Saberloon et al., "Application of Machine Vision Systems in Aquaculture with Emphasis on Fish: State-of-the-Art and Key Issues," Reviews in Aquaculture, Dec. 2017, 9:369-387.
Stein et al., "Consistent melanophore spot patterns allow long-term individual recognition of Atlantic salmon Salmo Salar." Journal of Fish Biology, Nov. 2017, 91(6):1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.
www.akvagroup.com [online], "Subsea Feeding," Feb. 2019, retrieved on Apr. 26, 2021, retrieved from URL<https://www.akvagroup.com/pen-based-aquaculture/feed-systems/subsea-feeding>, 5 pages.
International Search Report and Written Opinion in International Appln No. PCT/US2022/022837, dated Aug. 2, 2022, 14 pages
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.

(56) References Cited

OTHER PUBLICATIONS

International Search Report and Written Opinion in International Appln No. PCT/US2022/022589, dated Jul. 7, 2022, 12 pages.
International Search Report and Written Opinion in International Appln No. PCT/US2022/023831, dated Jul. 8, 2022, 13 pages.

\* cited by examiner

AUTOMATED CAMERA POSITIONING FOR FEEDING BEHAVIOR MONITORING

CROSS REFERENCE TO RELATED APPLICATION

This application is a continuation of U.S. application Ser. No. 17/246,911, filed on May 3, 2021. The disclosure of the prior application is considered part of and is incorporated by reference in the disclosure of this application.

TECHNICAL FIELD

This specification relates to aquaculture systems, and more specifically, to automated camera positioning for aquaculture feeding behavior monitoring.

BACKGROUND

Aquaculture refers to the breeding, rearing, and harvesting of animals and plants in all types of water environments under controlled conditions. One of the methods of aquaculture involves aquafarming, which is fish farming in tanks or ocean enclosures.

Offshore aquafarms can include feeding systems that introduce feed into the enclosure under the water surface, such as subfeeders. Monitoring the feeding behavior of fish in the ocean can be important to determine the amount of feed that is being consumed by the fish, and to modify the feeding regimen accordingly.

However, monitoring the feeding behavior offshore can pose significant challenges due to severe weather conditions and strong ocean currents that may arise. For effective feeding observation, monitoring equipment is typically submerged under water where it can collide with the feeding system or other objects.

Accordingly, there exists a growing need for systems and methods that would enable feeding behavior monitoring under the water surface in an effective and safe manner.

SUMMARY

Implementations of the present disclosure include methods for automated camera positioning for feeding behavior monitoring. More particularly, implementations of the present disclosure determine a positon of a camera underwater based on a spatial model of a subfeeder from which a feed is delivered to farmed fish.

In some implementations, the method includes the actions of: obtaining, by a camera of a control system that includes (i) the camera, ii) a subfeeder that includes a pipe that delivers feed underwater, (iii) a position estimator, and (iv) a winch controller, an image of a scene, obtaining, by the position estimator, a spatial model that corresponds to the subfeeder, obtaining, by the position estimator, calibration parameters of the camera, determining, by the position estimator and based on the spatial model, the image of the scene, and the calibration parameters of the camera, a size of the subfeeder in the image of the scene, selecting, by the position estimator and based on the size of the subfeeder in the image of the scene, an updated position of the camera relative to the subfeeder, providing, by the position estimator, the updated position of the camera relative to the subfeeder to the winch controller, and moving, by the winch controller, the camera to the updated position.

In some implementations, selecting, by the position estimator and based on the size of the subfeeder in the image of the scene, the updated position of the camera comprises: dynamically selecting the updated position of the camera relative to the subfeeder.

In some implementations, the updated position comprises a preferred position of the camera relative to the subfeeder associated with the spatial model of the subfeeder.

In some implementations, selecting, by the position estimator and based on the size of the subfeeder in the image of the scene, the updated position of the camera relative to the subfeeder, comprises: determining a depth of the subfeeder that characterizes a distance of the camera that obtained the image of the scene from the subfeeder, determining, based on the depth of the subfeeder, a current position of the camera relative to the subfeeder, and selecting, based on the current position of the camera relative to the subfeeder, the updated position of the camera relative to the subfeeder.

In some implementations, determining the depth of the subfeeder that characterizes the distance of the camera that obtained the image of the scene from the subfeeder comprises: determining a number of pixels in the image of the scene that depict the subfeeder.

In some implementations, determining the depth of the subfeeder that characterizes the distance of the camera that obtained the image of the scene from the subfeeder comprises: correlating the spatial model of the subfeeder within the image of the scene with the calibration parameters of the camera.

In some implementations, in the image of the scene, the subfeeder is at least partially obscured by another object.

In some implementations, the method further includes: determining, by the position estimator, based on the spatial model of the subfeeder, the calibration parameters of the camera, and the image of the scene, a current position of the camera relative to the subfeeder, and where selecting, by the position estimator and based on the size of the subfeeder in the image of the scene, an updated position of the camera relative to the subfeeder comprises: selecting the updated position of the camera relative to the subfeeder such that a feed is visible within the image of the scene.

In some implementations, determining, by the position estimator, based on the spatial model of the subfeeder, the calibration parameters of the camera, and the image of the scene, the current position of the camera relative to the subfeeder comprises: determining that at the current position of the camera relative to the subfeeder a feed is not visible within the image of the scene.

The present disclosure further provides one or more non-transitory computer-readable storage medium coupled to one or more processors that, when executed by the one or more processors, cause the one or more processors to perform operations in accordance with implementations of the methods provided herein.

The present disclosure further provides a system for implementing the methods provided herein. The system includes one or more computers and one or more storage devices storing instructions that are operable, when executed by the one or more computers, to cause the one or more computers to perform operations in accordance with implementations of the methods provided herein.

Implementations of the present disclosure provide one or more of the following technical advantages and improvements over previously available solutions.

An automated system for feeding behavior monitoring can provide more accurate determination of feeding behavior and can increase the efficiency and sustainability of aquafarming. For example, the automated control can ensure that a camera is optimally positioned to capture images from which the feeding behavior of fish and unconsumed feeding pellets can be discerned. Accordingly, the feeding regimen can be appropriately modified so as to decrease feed wastage and improve growth yield.

The automated system for feeding behavior monitoring can obtain images of fish consuming the feed and determine where the camera should be placed on this basis. For example, the camera can be controlled such that the fish appear in the field of view of the camera, and a position of the camera can be determined such that it is located proximally to the feeding location. However, the feed delivered by a subfeeder in the enclosure can concentrate in close proximity to the subfeeder at localized areas with limited spread. As a result, the consumption of the feed by the fish tends to occur proximally to the feeding structure, which affects optimal camera positioning for monitoring. On the one hand, the camera should be positioned close enough to enable feeding behavior monitoring, and on the other hand the camera should be protected from collisions with the subfeeder and other underwater structures as the sea state moves things around.

Further, some subfeeders can be configured in different geometries. For example, some subfeeders can include protruding structures, such as sharp corners, that can collide with the camera. Accordingly, the systems described in this specification determine positioning of the camera by using a spatial model of a particular type of subfeeder, which can include detailed design features or other attributes of the feeding structure and provide information about optimal positioning of the camera such that collisions with the particular type of subfeeder are avoided. Therefore, the systems described in this specification can provide more accurate determination of feeding behavior while minimizing the likelihood of collision damage to the camera.

BRIEF DESCRIPTION OF THE DRAWINGS

Like reference symbols in the various drawings indicate like elements.

DETAILED DESCRIPTION

Figure 1:
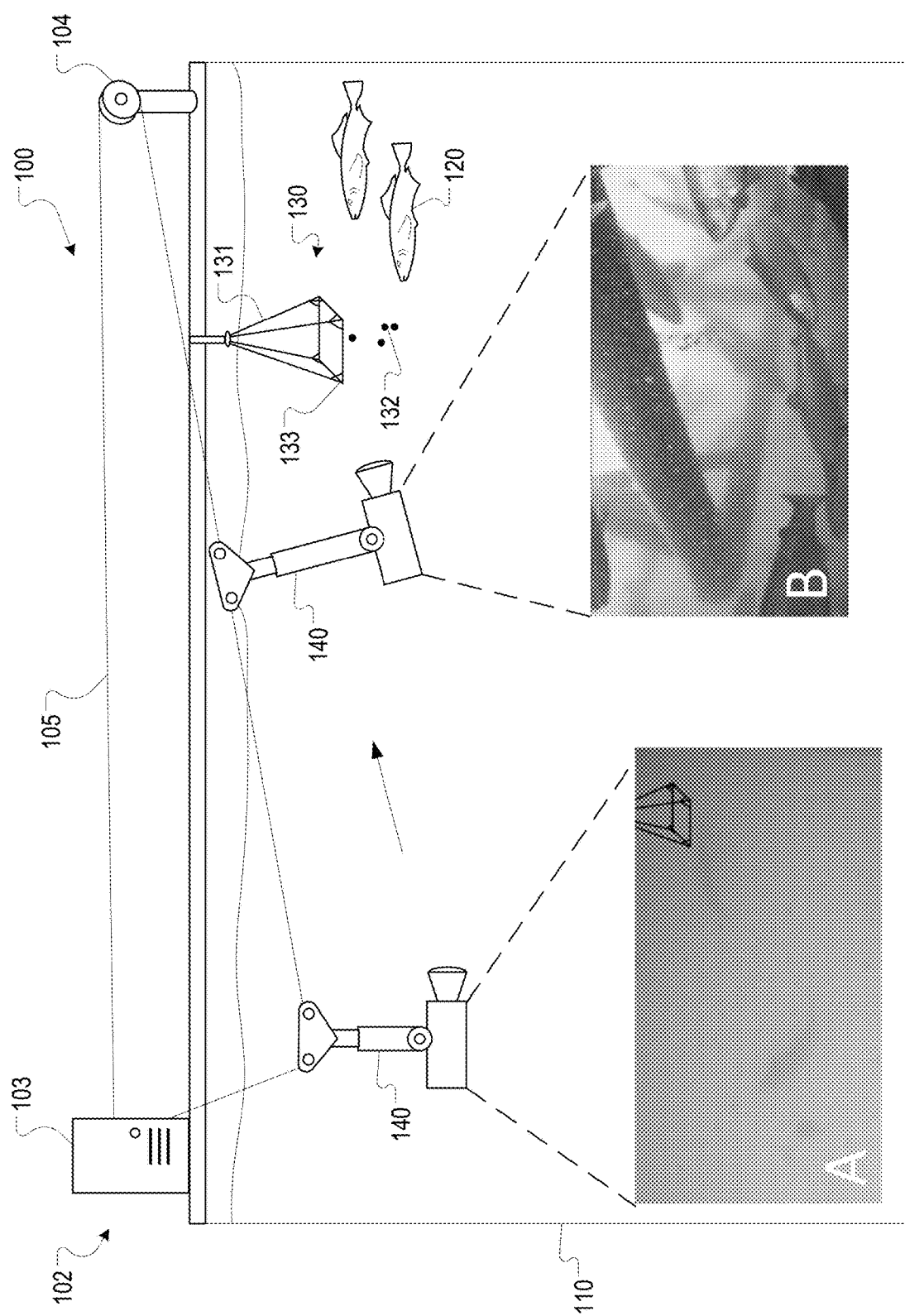
FIG. 1 depicts an example application of the implementations of the present disclosure.

FIG. 1 depicts an example camera positioning system 100 and an enclosure 110 that contains aquatic livestock. The livestock can be aquatic creatures, such as fish 120 swimming freely within the confines of the enclosure 110. In some implementations, the aquatic livestock 120 can include finfish, juvenile fish, koi fish, sharks, salmon, bass, and others. In addition to the aquatic livestock, the enclosure 110 contains water, e.g., seawater, freshwater, or rainwater, although the enclosure can contain any fluid that is capable of sustaining a habitable environment for the aquatic livestock.

In some implementations, the camera positioning system 100 can be anchored to a structure such as a pier, a dock, or a buoy, instead of being confined within the enclosure 110. For example, instead of being confined within the enclosure 110, the fish 120 can be free to roam in a body of water, and the camera positioning system 100 can monitor fish within a certain area of the body of water.

The camera positioning system 100 can further include an aquatic feeding subsystem 130 that delivers feed 132 to the fish 120 through a subfeeder 131 that can be disposed at a depth (e.g., 8 meters) from the surface of the water. The subfeeder 131 is a structure including a main pipe that is connected to multiple manifold pipes. The feed 132 can travel from the main pipe through each of the manifold pipes, the ends of which define feeding points 133 (e.g., points at which the feed 132 exits the subfeeder 131 and enters the water). The manifold pipes and the feeding points 133 are disposed across the perimeter of the subfeeder 131. The subfeeder 131 can include any number of manifold pipes, and the perimeter of the subfeeder 131 can be square (as shown in FIG. 1) or circular in shape. Other configurations of the subfeeder are also possible.

In contrast to above-surface feeders, the feeding system 130 including the subfeeder 131 enables feeding the fish 120 deep under water, thereby reducing lice infestation and drifting of the feed 132 due to wind and strong currents in the upper water layer. Further, in contrast to above-surface feeders, the feed 132 from the subfeeder 131 can still be reliably delivered to the fish 120 in bad weather conditions (e.g., during a storm). In some implementations, the subfeeder 131 can include a device that can determine its absolute location, e.g., a GPS device coupled to a buoy, or any other appropriate device.

The camera positioning system 100 can further include a camera 140 that can monitor the feeding behavior of fish 120. The camera 140 can capture image and video data. In place of the camera 140, any other device, or combination of devices, can be provided that are capable of capturing image and video data. The camera 140 can be coupled to a winch subsystem 102 that can include a winch controller 103, one or more winch lines 105 on which the camera 140 is suspended, and one or more winches 104 coupled to the winch line 105.

The winch subsystem 102 can further include one or more motors, one or more power supplies, and one or more pulleys to which the winch line 105 is attached. The winch controller 130 can also fix the position of the camera 140 at a predetermined position with respect to the subfeeder 131. In response to a command received by the winch controller 103, the winch subsystem 102 can engage one or more motors to move the winch line 105, and the suspended camera 140, in x, y, and z directions, to a position dictated by the command. Further, the winch subsystem 102 can tilt the camera 140 to alter the viewing angle of the camera 140.

In some implementations, the subfeeder 131 can be coupled to the one or more winches 104, one or more winch lines 105, and the winch controller 103. A position of the subfeeder 131 can be estimated based on a length of the one or more winch lines 105 spooled out by the one or more winches 104.

The positioning of the camera 140 is important for effective feeding behavior monitoring. Generally, the feed 132 exiting the manifolds of the subfeeder 131 tends to be localized in the vicinity of feeding points 133 with limited spread. Accordingly, the fish 120 tend to consume the feed 132 at the feeding points 133 and in close proximity to the subfeeder 131. As a result, for effective feeding behavior monitoring, the camera 140 should be positioned in close proximity to the subfeeder 131. However, positioning the camera 140 too close to the subfeeder 131 poses risks of damage to the camera 140 because it can collide with other structures underwater, such as the subfeeder 131.

As shown in FIG. 1, when the camera 140 is positioned at position A, it is difficult to discern details relating to the feeding behavior from the images obtained by the camera 140. Although the camera 140 is protected from other structures at position A, effective feeding behavior monitoring cannot occur at this position.

A current position (e.g., position A) of the camera 140 can be estimated relative to an object (e.g., the subfeeder 131) identified in an image of a scene, obtained by the camera 140 at the current position, based on known parameters of the object. The subfeeder 131 can have a spatial model (e.g., a three-dimensional digital model, such as a CAD model) associated with it, that can include information about physical characteristics, such as mass, center of gravity, and dimensions, of the subfeeder 131. Such spatial model can be used to generate different candidate images for different orientations and/or angular positions of the subfeeder 131. Each candidate image can represent an angular view of the subfeeder that is represented by the spatial model. These candidate images can be used to identify the subfeeder 131 that is oblique in the image of the scene, because the candidate images provide a variety of positions, orientations, and angular views of the subfeeder 131.

The system described in this specification can select a first candidate image of the subfeeder 131 that presents the angular view of the subfeeder 131 that is substantially similar to the angular view (e.g., orientation) of the subfeeder 131 in the image of the scene obtained by the camera 140 at position A. The system can use the first candidate image of the subfeeder 131, the information contained in the spatial model of the subfeeder 131, and calibration parameters of the camera 140, to correlate the size and the position of the subfeeder 131 within the image of the scene. For example, based on the spatial model of the subfeeder 131, the orientation of the subfeeder 131 in the first candidate image and the image of the scene, and a number (or a location) of pixels that the subfeeder 131 occupies in the image of the scene, a depth of the subfeeder 131 can be estimated. The depth of the subfeeder 131 can indicate a distance from the subfeeder 131 to the camera 140 that obtained the image of the scene. In some implementations, the system can obtain locations of one or more corners (e.g., feeding points 133) of the subfeeder 131 and fit them to a parametrized model of the subfeeder 131 that includes the location and the pose of the subfeeder 131. In some implementations, the spatial model can include the enclosure 110 and/or objects contained within the enclosure 110. On this basis, the system can determine the current position of the camera 140 relative to the subfeeder 131.

When the camera 140 is positioned at an updated position (e.g., position B), the fish 120 and the feed 132 are discernible from the images obtained by the camera 140, which is optimal for effective feeding behavior monitoring. The updated position of the camera 140 can be estimated in a similar way as described above. For example, the system described in this specification can select a second different candidate image of the subfeeder 131 that presents the angular view of the subfeeder 131 that is substantially similar to the angular view (e.g., orientation) of the subfeeder 131 in a second different image of the scene obtained by the camera 140 at position B.

The system can use the second candidate image of the subfeeder 131, the information contained in the spatial model of the subfeeder 131, and calibration parameters of the camera 140, to correlate the size and the position of the subfeeder 131 within the second image of the scene. On this basis, the system can determine the updated position of the camera 140 relative to the subfeeder 131. In some implementations, the updated position can be, e.g., 1 meter, or less, vertically below the feeding points 133 of the subfeeder 131. In some implementations, the updated position can represent a tilt of the camera 140 relative to the subfeeder 131, i.e., an updated angle of view of the camera 140. In some implementations, the system can use the current position of the camera 140 relative to the subfeeder 131 (e.g., position A determined previously), and absolute position of the subfeeder 131, to estimate an updated position of the camera 140 relative to the subfeeder 131 (e.g., position B).

The positions and the orientations of the subfeeder 131 and the camera 140 can change due to, e.g., wind and strong ocean currents, and the systems described in this specification can dynamically estimate and update the position of the camera 140 relative to the subfeeder 131. Therefore, the systems described in this specification can maximize the effectiveness of feeding behavior monitoring while minimizing the likelihood of collisions of the camera 140 with the subfeeder 131.

Figure 2:
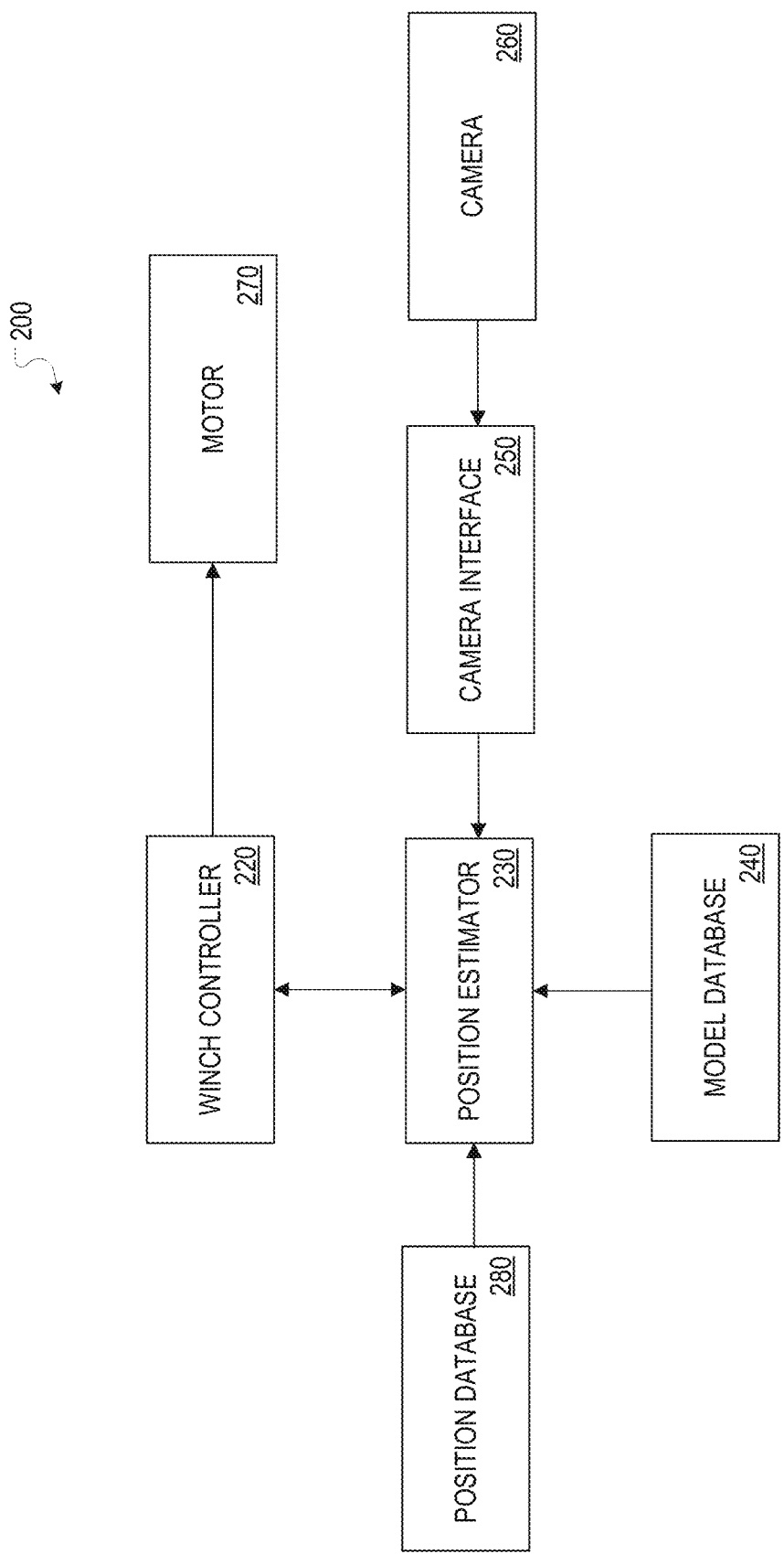
FIG. 2 depicts an example system for performing the operations according to the implementations of the present disclosure.

FIG. 2 depicts an example system 200 for performing the operations according to the implementations of the present disclosure. The system 200 can be implemented by a combination of hardware, software and firmware.

The system 200 can include a camera 260 for capturing image and video data (e.g., an image of a scene). In place of the camera 260, any device, or combination of devices, that are capable of generating image and video data can be used. The system 200 further includes a camera interface 250 communicatively coupled to the camera 260. The camera interface 250 can receive image and video data from the camera 260 and provide it as an input to other components of the system 200.

The system 200 further includes a position database 280 communicatively coupled to a position estimator 230. The position database 280 stores information about an absolute position (or an estimate) of a subfeeder (e.g., the subfeeder 131 in FIG. 1). For example, the position database 280 can receive measurements from a device coupled to the subfeeder 131 (e.g., a GPS device, a position encoder coupled to a winch and the subfeeder 131 by a winch line, or any other appropriate device), determine its position, and store the position information.

Alternatively, the absolute position information of the subfeeder can be provided to the position database 280 manually by an operator. The position database 280 can also include information about an absolute position of the camera 260. The absolute position of the camera can be determined by e.g., obtaining data from a GPS attached to the camera 260, measuring a length of a winch line that is coupled to the camera 260 and spooled out from a winch, or any other suitable means. The information in the position database 280 can be used by the position estimator 230 to determine a current position of the camera 140 relative to the subfeeder 131, and estimate an updated position of the camera 140 relative to the subfeeder 131.

The system 200 further includes a spatial model database 240 communicatively coupled to the position estimator 230. The spatial model database 240 can include a spatial model that contains specifications of the subfeeder (e.g., the subfeeder 131 in FIG. 1). The spatial model can be a digital model, such as a computer aided design (CAD) model that can be manipulated, e.g., tilted in an arbitrary angle. Each different type of subfeeder (e.g., a subfeeder with a square perimeter, a subfeeder with a circular perimeter, and any other type of subfeeder) can have a corresponding spatial model associated with it. The spatial model can include metadata information about identity, characteristics, and/or visual appearance such as size, configuration, and different orientations, of the subfeeder that the model represents. In some implementations, the spatial model can include information about physical characteristics, such as center of gravity and/or different axis, of the respective subfeeder. Further, the spatial model can contain information about a particular type of subfeeder including non-visible features, such as temperature, magnetic field, etc. of different parts of the subfeeder.

The position estimator 230 can receive position information from the position database 280, spatial model information of the subfeeder from the spatial model database 240, and the image of the scene obtained by the camera 260, and determine a current position of the camera relative to the subfeeder (e.g., position A in FIG. 1). As described above, the spatial model can be used by the position estimator 230 to generate different candidate images for different orientations and/or angular positions of the subfeeder. Each candidate image can represent an angular view of the subfeeder that is represented by the spatial model. These candidate images can be used to identify the subfeeder that is oblique in the image of the scene obtained by the camera 260, because the candidate images provide a variety of positions, orientations, and angular views of the subfeeder.

The position estimator 230 can select a candidate image of the subfeeder that presents the angular view of the subfeeder that is substantially similar to the angular view (e.g., orientation) of the subfeeder in the image of the scene obtained by the camera 260. The position estimator 230 can use the candidate image, the information contained in the spatial model, and calibration parameters of the camera 260, to correlate the size and the position of the subfeeder within the image of the scene.

For example, based on the spatial model of the subfeeder, the orientation of the subfeeder in the candidate image, and a number of pixels that the subfeeder occupies in the image of the scene, a depth of the subfeeder can be estimated. The depth of the subfeeder can indicate a distance from the subfeeder to the camera 260 that obtained the image of the scene. On this basis, the position estimator can determine the position of the camera relative to the subfeeder (e.g., to a feeding point 133 of the subfeeder 131 in FIG. 1).

The position estimator 230 can estimate an updated position (e.g., position B in FIG. 1) of the camera relative to the subfeeder. The updated position can be estimated in a similar way as described above. For example, the position estimator 230 can select a second different candidate image of the subfeeder that presents the angular view of the subfeeder that is substantially similar to the angular view (e.g., orientation) of the subfeeder in a second different image of the scene obtained by the camera 140 at the updated position. The system can use the second candidate image of the subfeeder, the information contained in the spatial model of the subfeeder, and calibration parameters of the camera, to correlate the size and the position of the subfeeder within the second image of the scene obtained by the camera 260. On this basis, the position estimator 230 can estimate the updated position of the camera 260 relative to the subfeeder. In other implementations, the position estimator 230 can use the information about the current position of the camera 260 relative to the subfeeder, and information about the absolute position of the subfeeder stored in the position database 280, to estimate an updated position of the camera 260 relative to the subfeeder.

In this way, the position estimator 230 can estimate an optimal position of the camera 260 for the particular type of subfeeder, thereby reducing the likelihood of collision damage to the camera 260 while ensuring effective feeding behavior monitoring.

The position estimator 230 can provide a command to the winch controller 220 to move the camera to the updated position. The winch controller, in turn, can operate the motor 270 to move the camera, in a similar way as described above with reference to FIG. 1, to the updated position.

Further, the position estimator 230 can dynamically estimate an updated position of the camera 260 relative to the subfeeder. For example, the camera 260 can continuously generate image and video data and provide it to the position estimator 230, and the position estimator 230 can iteratively estimate the current position of the camera 260 relative to the subfeeder. At each iteration, the position estimator 230 can estimate an updated position of the camera 260 relative to the subfeeder, in a similar way as described above, and provide it to the winch controller 220, that can engage the motor 270 to move the camera 260 to the updated position at each iteration. In some implementations, the position estimator 230 can iteratively estimate an updated position of the camera 260 relative to the subfeeder based on the current position of the camera 260 relative to the subfeeder and the absolute position of the subfeeder obtained from the position database 280.

In this way, the system 200 can dynamically adjust the position of the camera 260 relative to the subfeeder, when the subfeeder (or the camera, or both) undergoes a change in position due to the influence of e.g., wind, or strong ocean currents. This, in turn, enables the system 200 to prevent collisions of the camera with the subfeeder and to provide optimal positioning of the camera 260 for effective feeding behavior monitoring.

Figure 3:
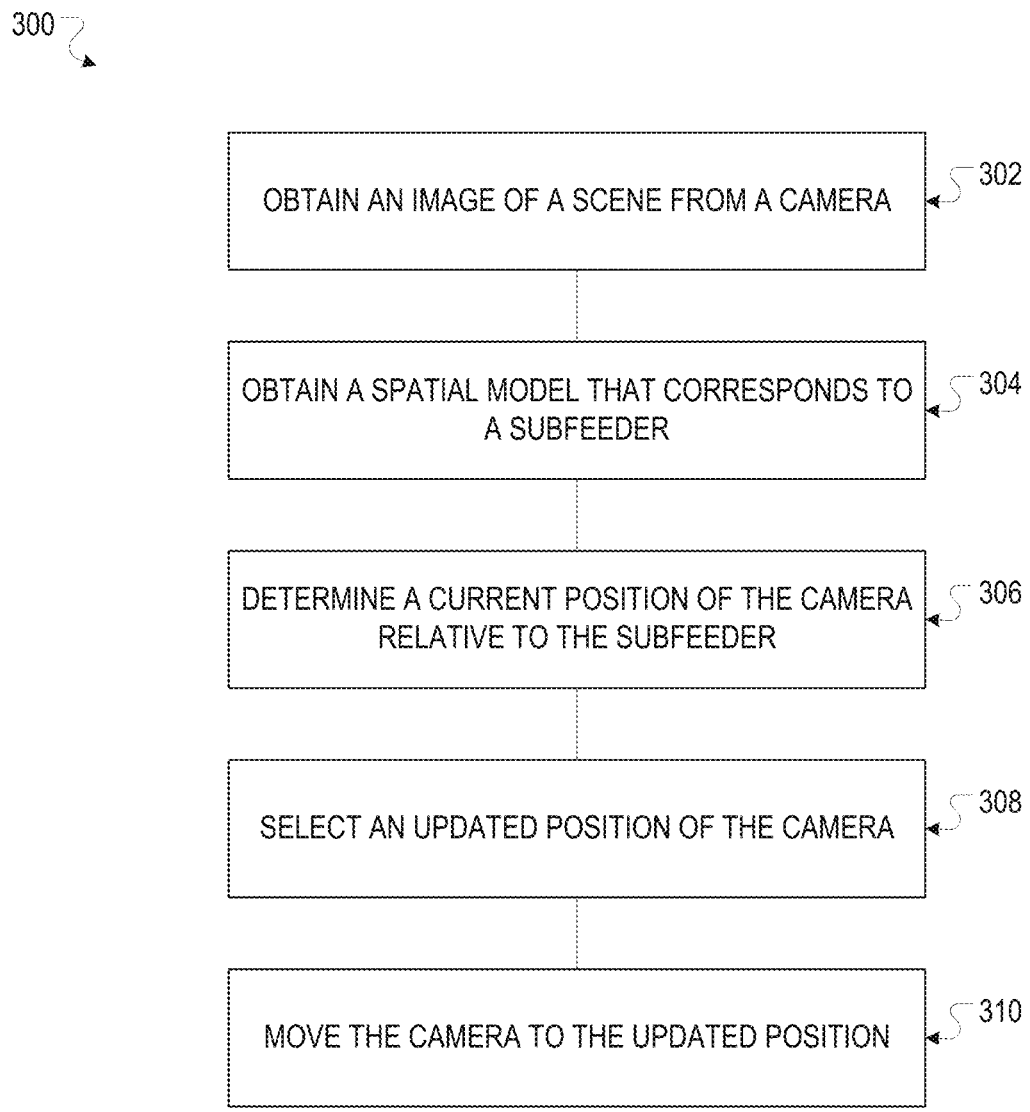
FIG. 3 depicts an example process that can be executed in accordance with implementations of the present disclosure.

FIG. 3 depicts an example process 300 that can be executed in accordance with the implementations of the present disclosure. In some implementations, the example process 300 can be performed using one or more computer-executable programs executed using one or more computing devices. The process 300 can be performed by the system 200 depicted in FIG. 2.

The system obtains, by one or more cameras of a control system, an image of a scene (302). The scene can include, for example, a view of the subfeeder, as shown by location A in FIG. 1.

The system obtains, by the position estimator, a spatial model that corresponds to the subfeeder, the spatial model being obtained from the database of spatial models (304). As described above, each different type of subfeeder can include a corresponding spatial model containing specifications of the subfeeder.

The system determines, by the position estimator, based on data from the spatial model and the image of the scene, a current position of the one or more cameras relative to the subfeeder (306). In some implementations, the system can receive a calibration information of one or more cameras by the position estimator and correlate the spatial model of the subfeeder within the image of the scene with the calibration information of the one or more cameras. In some implementations, the subfeeder within the image of the scene can be partially obscured by another object (e.g., fish), and the system can check the spatial model to determine the relevant information about the subfeeder that is not present in the image of the scene due to the obstruction. The spatial model can indicate metadata of the subfeeder, including a dimension of a portion of the subfeeder that is not discernable from the image of the scene.

The system selects, by the position estimator, an updated position of the one or more cameras relative to the subfeeder (308). The system can dynamically select the updated position of the one or more cameras relative to the subfeeder. As described above, the system can iteratively determine the updated position of the camera relative to the subfeeder based on images obtained from the camera. The updated position can include a preferred position of the one or more cameras relative to the subfeeder associated with the spatial model of the subfeeder. In some implementations, the system can determine the updated position so as to avoid a sharp corner of the subfeeder while positioning the camera in close proximity to the subfeeder. In another implementation, the system can determine the updated position to be proximal to a feeding point of a particular type of subfeeder. If the system determines that at the current position of the one or more cameras relative to the subfeeder a feed is not visible within the image of the scene, the system can select the updated position of the one or more cameras relative to the subfeeder such that the feed is visible within the image of the scene. The updated position of the one or more cameras relative to the subfeeder can be located, for example, at a depth of 1 meter or less below a feeding point of the subfeeder.

The system provides, by the position estimator, the updated position of the one or more cameras relative to the subfeeder to the winch controller (308).

The system moves (310), by the winch controller, the one or more cameras to the updated position. As described above, the winch controller can engage the motor and move the camera to the updated position. Accordingly, the system 200 can position the camera to enable effective feeding behavior monitoring while minimizing the likelihood of collisions of the camera with the feeding system.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

The invention claimed is:

1. A method comprising:
obtaining, by a camera of a control system that includes (i) the camera, ii) a subfeeder that includes a pipe that delivers feed underwater, (iii) a position estimator, and (iv) a winch controller, an image of a scene;
obtaining, by the position estimator, a spatial model that corresponds to the subfeeder;
obtaining, by the position estimator, calibration parameters of the camera;
determining, by the position estimator and based on the spatial model, the image of the scene, and the calibration parameters of the camera, a size of the subfeeder in the image of the scene;
selecting, by the position estimator and based on the size of the subfeeder in the image of the scene, an updated position of the camera relative to the subfeeder;

providing, by the position estimator, the updated position of the camera relative to the subfeeder to the winch controller; and moving, by the winch controller, the camera to the updated position.

2. The method of claim 1, wherein selecting, by the position estimator and based on the size of the subfeeder in the image of the scene, the updated position of the camera comprises: dynamically selecting the updated position of the camera relative to the subfeeder.

3. The method of claim 1, wherein the updated position comprises a preferred position of the camera relative to the subfeeder associated with the spatial model of the subfeeder.

4. The method of claim 1, wherein selecting, by the position estimator and based on the size of the subfeeder in the image of the scene, the updated position of the camera relative to the subfeeder, comprises:

determining a depth of the subfeeder that characterizes a distance of the camera that obtained the image of the scene from the subfeeder;

determining, based on the depth of the subfeeder, a current position of the camera relative to the subfeeder; and selecting, based on the current position of the camera relative to the subfeeder, the updated position of the camera relative to the subfeeder.

5. The method of claim 4, wherein determining the depth of the subfeeder that characterizes the distance of the camera that obtained the image of the scene from the subfeeder comprises:

determining a number of pixels in the image of the scene that depict the subfeeder.

6. The method of claim 4, wherein determining the depth of the subfeeder that characterizes the distance of the camera that obtained the image of the scene from the subfeeder comprises:

correlating the spatial model of the subfeeder within the image of the scene with the calibration parameters of the camera.

7. The method of claim 1, wherein, in the image of the scene, the subfeeder is at least partially obscured by another object.

8. The method of claim 1, comprising:

determining, by the position estimator, based on the spatial model of the subfeeder, the calibration parameters of the camera, and the image of the scene, a current position of the camera relative to the subfeeder, and wherein selecting, by the position estimator and based on the size of the subfeeder in the image of the scene, an updated position of the camera relative to the subfeeder comprises:

selecting the updated position of the camera relative to the subfeeder such that a feed is visible within the image of the scene.

9. The method of claim 8, wherein determining, by the position estimator, based on the spatial model of the subfeeder, the calibration parameters of the camera, and the image of the scene, the current position of the camera relative to the subfeeder comprises:

determining that at the current position of the camera relative to the subfeeder a feed is not visible within the image of the scene.

10. A system comprising one or more computers and one or more storage devices storing instructions that are operable, when executed by the one or more computers, to cause the one or more computers to perform operations comprising:

obtaining an image of a scene;
obtaining a spatial model that corresponds to a subfeeder;
obtaining calibration parameters of a camera that captured the image of the scene;
determining, based on the spatial model, the image of the scene, and the calibration parameters of the camera, a size of the subfeeder in the image of the scene;
selecting, based on the size of the subfeeder in the image of the scene, an updated position of the camera relative to the subfeeder;
providing the updated position of the camera relative to the subfeeder to a winch controller; and
moving the camera to the updated position.

11. The system of claim 10, wherein selecting, based on the size of the subfeeder in the image of the scene, the updated position of the camera comprises:

dynamically selecting the updated position of the camera relative to the subfeeder.

12. The system of claim 10, wherein the updated position comprises a preferred position of the camera relative to the subfeeder associated with the spatial model of the subfeeder.

13. The system of claim 10, wherein selecting, based on the size of the subfeeder in the image of the scene, the updated position of the camera relative to the subfeeder, comprises:

determining a depth of the subfeeder that characterizes a distance of the camera that obtained the image of the scene from the subfeeder;

determining, based on the depth of the subfeeder, a current position of the camera relative to the subfeeder; and selecting, based on the current position of the camera relative to the subfeeder, the updated position of the camera relative to the subfeeder.

14. The system of claim 13, wherein determining the depth of the subfeeder that characterizes the distance of the camera that obtained the image of the scene from the subfeeder comprises:

determining a number of pixels in the image of the scene that depict the subfeeder.

15. The system of claim 13, wherein determining the depth of the subfeeder that characterizes the distance of the camera that obtained the image of the scene from the subfeeder comprises:

correlating the spatial model of the subfeeder within the image of the scene with the calibration parameters of the camera.

16. One or more non-transitory computer-readable storage medium coupled to one or more processors that, when executed by the one or more processors, cause the one or more processors to perform operations comprising:

obtaining an image of a scene;
obtaining a spatial model that corresponds to a subfeeder;
obtaining calibration parameters of a camera that captured the image of the scene;
determining, based on the spatial model, the image of the scene, and the calibration parameters of the camera, a size of the subfeeder in the image of the scene;
selecting, based on the size of the subfeeder in the image of the scene, an updated position of the camera relative to the subfeeder;
providing the updated position of the camera relative to the subfeeder to a winch controller; and
moving the camera to the updated position.

17. The one or more non-transitory computer-readable storage medium of claim 16, wherein selecting, based on the size of the subfeeder in the image of the scene, the updated position of the camera comprises:
   dynamically selecting the updated position of the camera relative to the subfeeder.

18. The one or more non-transitory computer-readable storage medium of claim 16, wherein the updated position comprises a preferred position of the camera relative to the subfeeder associated with the spatial model of the subfeeder.

19. The one or more non-transitory computer-readable storage medium of claim 16, wherein selecting, based on the size of the subfeeder in the image of the scene, the updated position of the camera relative to the subfeeder, comprises:
   determining a depth of the subfeeder that characterizes a distance of the camera that obtained the image of the scene from the subfeeder;
   determining, based on the depth of the subfeeder, a current position of the camera relative to the subfeeder; and
   selecting, based on the current position of the camera relative to the subfeeder, the updated position of the camera relative to the subfeeder.

20. The one or more non-transitory computer-readable storage medium of claim 19, wherein determining the depth of the subfeeder that characterizes the distance of the camera that obtained the image of the scene from the subfeeder comprises:
   determining a number of pixels in the image of the scene that depict the subfeeder.

* * * * *